United States Patent
Fredericks et al.

(10) Patent No.: US 9,475,579 B2
(45) Date of Patent: Oct. 25, 2016

(54) VERTICAL TAKE-OFF AND LANDING VEHICLE WITH INCREASED CRUISE EFFICIENCY

(71) Applicant: The United States of America as represented by the Administrator of the National Aeronautics and Space Administration, Washington, DC (US)

(72) Inventors: William J. Fredericks, Williamsburg, VA (US); Mark D. Moore, Williamsburg, VA (US); Ronald C. Busan, Newport News, VA (US); Paul M. Rothhaar, Newport News, VA (US); David D. North, Williamsburg, VA (US); William M. Langford, Hampton, VA (US); Christopher T. Laws, Newport News, VA (US); William T. Hodges, Yorktown, VA (US); Zachary R. Johns, Virginia Beach, VA (US); Sandy R. Webb, Hampton, VA (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 31 days.

(21) Appl. No.: 14/121,001

(22) Filed: Aug. 13, 2014

(65) Prior Publication Data
US 2016/0244158 A1 Aug. 25, 2016

Related U.S. Application Data (60) Provisional application No. 61/865,347, filed on Aug. 13, 2013.

(51) Int. Cl.
*B64D 27/24* (2006.01)
*B64D 27/26* (2006.01)
(Continued)

(52) U.S. Cl.
CPC ........... *B64C 29/0033* (2013.01); *B64C 3/385* (2013.01); *B64C 3/40* (2013.01);
(Continued)

(58) Field of Classification Search
CPC B64D 27/24; B64D 27/02; B64D 2027/026; B64C 29/0033; B64C 29/0075; B64C 2201/088; B64C 3/385
See application file for complete search history.

(56) References Cited

U.S. PATENT DOCUMENTS 2,462,201 A * 2/1949 Kilgore ................. B64D 27/24
244/60
2,783,956 A * 3/1957 Harriss ................... B64C 3/385
244/48

(Continued)

FOREIGN PATENT DOCUMENTS

EP 2581308 A2 4/2013
GB 2497136 A 6/2013

OTHER PUBLICATIONS

Rothhaar, Paul M. et al., "NASA Langley Distributed Propulsion VTOL Tilt-Wing Aircraft Testing, Modeling, Simulation, Control, and Flight Test Development," 14th AIAA Aviation Technology, Integration, and Operations Conference, Jun. 18-20, 2014, pp. 1-14.

(Continued)

*Primary Examiner* — Tien Dinh
*Assistant Examiner* — Richard R Green
(74) *Attorney, Agent, or Firm* — Andrea Z. Warmbier (57) ABSTRACT

Systems, methods, and devices are provided that combine an advance vehicle configuration, such as an advanced aircraft configuration, with the infusion of electric propulsion, thereby enabling a four times increase in range and endurance while maintaining a full vertical takeoff and landing ("VTOL") and hover capability for the vehicle. Embodiments may provide vehicles with both VTOL and cruise efficient capabilities without the use of ground infrastructure. An embodiment vehicle may comprise a wing configured to tilt through a range of motion, a first series of electric motors coupled to the wing and each configured to drive an associated wing propeller, a tail configured to tilt through the range of motion, a second series of electric motors coupled to the tail and each configured to drive an associated tail propeller, and an electric propulsion system connected to the first series of electric motors and the second series of electric motors.

16 Claims, 7 Drawing Sheets

(51) Int. Cl.
- B64C 29/00 (2006.01)
- B64C 3/40 (2006.01)
- B64C 9/14 (2006.01)
- B64C 11/50 (2006.01)
- B64C 25/32 (2006.01)
- B64C 3/38 (2006.01)
- B64C 39/02 (2006.01)
- B64D 27/02 (2006.01)

(52) U.S. Cl.
CPC ........... B64C 9/14 (2013.01); B64C 11/50 (2013.01); B64C 25/32 (2013.01); B64C 39/024 (2013.01); B64D 27/24 (2013.01); B64D 27/26 (2013.01); *B64C 2201/042* (2013.01); *B64C 2201/044* (2013.01); *B64C 2201/108* (2013.01); *B64C 2201/165* (2013.01); *B64D 2027/026* (2013.01); *Y10S 903/903* (2013.01)

(56) References Cited

U.S. PATENT DOCUMENTS

| | | | | |
|---|---|---|---|---|
| 2,980,368 | A * | 4/1961 | Jakimiuk | B64C 25/66 244/102 R |
| 4,149,688 | A * | 4/1979 | Miller, Jr. | B64C 29/0033 244/12.4 |
| 4,605,185 | A * | 8/1986 | Reyes | B64D 27/24 244/55 |
| 4,900,226 | A * | 2/1990 | de Vries | B64C 11/50 416/34 |
| 5,082,204 | A * | 1/1992 | Croston | B64C 39/066 244/126 |
| 5,823,468 | A * | 10/1998 | Bothe | B64C 29/0033 244/12.3 |
| 7,131,613 | B2 * | 11/2006 | Kelly | B64B 1/20 244/127 |
| 8,469,306 | B2 * | 6/2013 | Kuhn, Jr. | B64C 29/0033 244/12.4 |
| 8,733,690 | B2 * | 5/2014 | Bevirt | B64C 29/0033 244/12.4 |
| 8,800,912 | B2 * | 8/2014 | Oliver | B64C 29/0033 244/12.4 |
| 9,096,312 | B2 | 8/2015 | Moxon | |
| 2004/0118969 | A1 | 6/2004 | MacCready et al. | |
| 2006/0254255 | A1 | 11/2006 | Okai et al. | |
| 2008/0184906 | A1 * | 8/2008 | Kejha | B64D 27/24 244/13 |
| 2011/0001020 | A1 * | 1/2011 | Forgac | B64C 29/0033 244/7 A |
| 2011/0315809 | A1 * | 12/2011 | Oliver | B64C 29/0033 244/12.4 |
| 2012/0012692 | A1 * | 1/2012 | Kroo | B64C 29/0025 244/6 |
| 2013/0094963 | A1 * | 4/2013 | Rolt | B64D 27/24 416/1 |

OTHER PUBLICATIONS

Busan, Ronald C. et al., "Enabling Advanced Wind-Tunnel Research Methods Using the NASA Langley 12-Foot 2 Low Speed Tunnel," 14th AIAA Aviation Technology, Integration, and Operations Conference, Jun. 16-20, 2014, pp. 1-22.

Moore, Mark D. et al., "High-Speed Mobility Through On-Demand Aviation," AIAA Aviation Technology, Integration, and Operations Conference, Aug. 12-14, 2013, pp, 1-27, Los Angeles, CA.

Fredericks, William J. et al., "Benefits of Hybrid-Electric Propulsion to Achieve 4x Increase in Cruise Efficiency for a VTOL Aircraft," AIAA Aviation Technology, Integration, Operations Conference, Aug. 12-14, 2013, pp. 1-21, Los Angeles, CA.

Moore, Mark D. "High Speed Mobility Through On-Demand Aviation," Presentation Slides, AIAA Aviation Technology, Integration, and Operations Conference, Aug. 12-14, 2013, pp. 1-34, Los Angeles, CA.

Fredericks, William, J. et al., "Project Reimar III Greased Lightning Overview," NASA Aeronautics Presentation Slides, Jan. 28, 2013, pp. 1-17.

Bradley, M. et al., "NASA N+3 Subsonic Ultra Green Aircraft Research Sugar Final Review," Apr. 20, 2010, http://aviationweek.typepad.com/files/boeing_sugar_phase_i_final_review_v5.pdf.

* cited by examiner

VERTICAL TAKE-OFF AND LANDING VEHICLE WITH INCREASED CRUISE EFFICIENCY

CROSS-REFERENCE TO RELATED PATENT APPLICATIONS

This patent application claims the benefit of and priority to U.S. Provisional Patent Application No. 61/865,347, filed on Aug. 13, 2013, the entire contents of which are hereby incorporated by reference in their entirety.

STATEMENT REGARDING FEDERALLY SPONSORED RESEARCH OR DEVELOPMENT

The invention described herein was made in part by employees of the United States Government and may be manufactured and used by or for the Government of the United States of America for governmental purposes without the payment of any royalties thereon or therefore.

BACKGROUND OF THE INVENTION

Vertical takeoff and landing ("VTOL") and cruise efficiency are diametrically opposed requirements for aircraft. There are system solutions today that require ground infrastructure, namely catapults and arresting equipment, to launch and recover cruise efficient aircraft, thereby imparting these aircraft with VTOL like capabilities. These current multi-part systems remove the need for the actual aircraft to perform VTOL, but the system as a whole (i.e., aircraft plus ground infrastructure) becomes a VTOL system. With these current systems it is not possible to meet both VTOL and cruise efficiency requirements without the use of ground infrastructure.

BRIEF SUMMARY OF THE INVENTION

The systems, methods, and devices of the present invention combine an advanced vehicle configuration, such as an advanced aircraft configuration, with the infusion of electric propulsion, thereby enabling a four times increase in range and endurance while maintaining a full vertical takeoff and landing ("VTOL") and hover capability for the vehicle. In this manner, various embodiments may provide vehicles, such as aircraft, with both VTOL and cruise efficient capabilities that may meet VTOL and cruise efficiency requirements without the use of ground infrastructure. The various embodiments may provide a VTOL and cruise efficient vehicle, such as an aircraft, comprising a wing configured to tilt through a range of motion, a first series of electric motors coupled to the wing and each configured to drive an associated wing propeller, a tail configured to tilt through the range of motion, a second series of electric motors coupled to the tail and each configured to drive an associated tail propeller, and an electric propulsion system connected to the first series of electric motors and the second series of electric motors. In a further embodiment, the electric propulsion system may be a battery augmented series hybrid electric propulsion system comprising one or more internal combustion engines, one or more generators coupled to the one or more internal combustion engines and connected to the first series of electric motors and the second series of electric motors, and one or more batteries connected to the first series of electric motors and the second series of electric motors.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION OF THE INVENTION

For purposes of description herein, it is to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The word "exemplary" is used herein to mean "serving as an example, instance, or illustration." Any implementation described herein as "exemplary" is not necessarily to be construed as preferred or advantageous over other implementations.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Electric propulsion may enable radical new vehicle concepts and configurations, particularly for vertical takeoff and landing ("VTOL") aircraft because electric propulsion may address the significant mismatch between takeoff and cruise power conditions experienced by VTOL aircraft. The ability to distribute the thrust across the airframe, without mechanical complexity and with a scale free propulsion system, may provide a new degree of freedom for aircraft designers.

The various embodiment vehicle configurations may combine an advanced vehicle configuration, such as an advanced aircraft configuration, with the infusion of electric propulsion, thereby enabling a four times increase in range and endurance while maintaining a full VTOL and hover capability (similar to the VTOL and hover capabilities of a helicopter) for the vehicle. A "full VTOL" may be defined as taking off or landing the vehicle vertically without requiring a rolling takeoff or landing, or any horizontal movement. In this manner, various embodiments may provide vehicles, such as aircraft, with both VTOL and cruise efficient capabilities that may meet VTOL and cruise efficiency requirements without the use of ground infrastructure. Cruise efficient vehicles, such as cruise efficient aircraft, may provide various efficiencies based on the vehicle mission, such as reduced energy consumption during flight, long range, and/or long endurance. The various embodiments may also provide the ability to achieve low disc-loading for low ground impingement velocities, low noise, and/or hover power reduction/minimization which may reduce energy consumption in a VTOL phase of flight.

The systems, methods, and devices of the various embodiments may provide a VTOL and cruise efficient vehicle, such as an aircraft, comprising a wing configured to tilt through a range of motion, a first series of electric motors coupled to the wing and each configured to drive an associated wing propeller, a tail configured to tilt through the range of motion, a second series of electric motors coupled to the tail and each configured to drive an associated tail propeller, and an electric propulsion system connected to the first series of electric motors and the second series of electric motors. In a further embodiment, the electric propulsion system may be a battery augmented series hybrid electric propulsion system comprising one or more internal combustion engines, one or more generators coupled to the one or more internal combustion engines and connected to the first series of electric motors and the second series of electric motors, and one or more batteries connected to the first series of electric motors and the second series of electric motors.

Electric propulsion may be scale-free in terms of being able to achieve highly similar levels of motor power to weight and efficiency across a dramatic scaling range. Using distributed electric propulsion may enable the various embodiment advanced aircraft configurations to achieve improvements in aerodynamic efficiency that may be approximately four times that of conventional helicopter configurations. Helicopters typically achieve a lift to drag ratio (L/D) of between 4 and 5, while the various embodiment VTOL aircraft may achieve an L/D of approximately 20. The various embodiments provide the ability to eliminate the problem of advancing and retreating rotor blades by converting into wing born flight without the mechanical complexity of previous VTOL aircraft.

The various embodiments may utilize hybrid electric propulsion to normalize the power across the mission phases and to enable the combustion engine to be sized for wing born flight and batteries may be used to supplement the power required in hover. This may yield an overall lighter propulsion system, which may make for a smaller aircraft, which may lead to lower cost.

In an embodiment, an aircraft may have one or more propellers, such as one, two, three, four, five, six, seven, eight, nine, or ten or more propellers, and one or more electric motors may distribute thrust across the propellers. For example, the electric motors may distribute thrust across ten propellers. In an embodiment, propellers may be mounted to the leading edge of the wing of the aircraft and mounted to the leading edge of the tail of the aircraft. The number of propellers mounted to the leading edge of the wing of the aircraft and the leading edge of the tail of the aircraft may vary. For example, in an embodiment in which the aircraft may have ten propellers, eight propellers may be mounted to the leading edge of the wing and two propellers may be mounted to the leading edge of the tail of the aircraft. In an embodiment, at least a portion of the wing of the aircraft and at least a portion of the tail of the aircraft may both tilt to transition the aircraft between hovering flight and wing born flight. In an embodiment, the wing of the aircraft and the tail of the aircraft may both rotate around the lateral axis of the wing and tail, respectively, to tilt the wing and tail through a range of motion, thereby pitching the wing and tail up and/or down relative to the longitudinal axis of the aircraft to transition the aircraft between hovering flight (i.e., the VTOL phase) and wing born flight (i.e., the wing born flight phase). The range of motion may be any range of motion, such as less than 90 degrees, 90 degrees, approximately 90 degrees, greater than 90 degrees, etc. The tilting portions of the wing of the aircraft and the tail of the aircraft may tilt together or independently and may tilt to the same or different orientations in their respective ranges of motion.

In an embodiment, an aircraft may include a semi-tandem wing configuration. The semi-tandem wing configuration may provide a compromise between a tandem wing configuration, which carries half the lift on the tail, and a conventional wing configuration, which carries no lift on the tail. The center of gravity of the embodiment aircraft with the semi-tandem wing configuration may be located aft of the wing. The embodiment semi-tandem wing configuration may cause some lift to be carried on the tail of the aircraft, which may allow the propellers on the tail to carry some the aircraft's weight during a hover in the VTOL flight phase. For example, the tail may carry less than fifty percent of the lift. However, the wing may carry most of the lift of aircraft. The embodiment semi-tandem wing configuration may enable the wing to be proportionally larger than the tail and achieve a greater span in order to reduce induced drag. In an embodiment, the aircraft may be designed such that the center of gravity location is selected to have the propellers on the wing carry a higher percent of the aircraft's weight than the propellers on the tail. In this manner, the propellers on the tail may provide greater pitch control authority and reduce induced drag of the tail by reducing the amount of lift that may be required to be carried on the tail. The embodiment semi-tandem wing configuration with a lifting tail may be statically stable in the wing born flight phase (i.e., forward flight). In an embodiment, the aircraft may be designed such that the lift coefficient, tail loading, and lift curve slope of the tail may be less than the lift coefficient, wing loading, and lift curve slope of the wing. In an embodiment, the aircraft may include a swept wing to shift the aerodynamic center of the wing aft in forward flight and still keep the center of thrust forward in hovering flight when the wing is rotated up 90 degrees. In an embodiment, the sweep of the wing may enable a reduction in the induced drag of the aircraft. During a hover, propeller thrust needs to be distributed about the center of gravity of the aircraft. Without a swept wing, in forward flight the wing stays in front of the center of gravity resulting in only about eighty percent of the lift on the wing and twenty percent on the tail. However, in an embodiment with a swept wing, in a hover, the propellers are forward of the wing, but in forward flight the wing center is farther aft enabling ninety two percent of the lift to be on the wing and eight percent to be on the tail. Since the swept wing has higher span (i.e., lower span loading), it is more efficient to carry lift on the wing.

In an embodiment, forward flight propellers may be located at the wing tips of the aircraft. The wing tip forward flight propellers may provide a destructive interference between the propeller swirl and the wing tip vortex. The resulting interference may be viewed as an induced drag reduction or a propulsive efficiency increase. In an embodiment, the forward flight propellers may run for the entire mission (i.e., both during the VTOL flight phase and the wing born flight phase). In an embodiment, the forward flight propellers may run only during the wing born flight phase. In an embodiment, the forward flight propellers may be variable speed (e.g., variable revolutions per minute ("RPM")) and/or variable pitch propellers. The use of variable speed and/or pitch propellers may maximize propulsive efficiency.

In an embodiment, vertical flight propellers may fold down during the wing born flight phase. In an embodiment, the vertical flight propellers may fold into conformal recesses of the motor pylons. The folding of the vertical flight propellers, especially into conformal recesses, may reduce drag in the wing born flight phase when compared to leaving the vertical flight propellers deployed. In an embodiment, the vertical flight props may extend aft of the leading edge of the wing and/or tail when folded. In an embodiment, to prevent the vertical flight propellers from contacting the leading edge of the wing as the vertical flight propellers are started, the vertical flight propeller blades may ride along a sinusoidal cam to push the blades forward enough to avoid contact with the leading edge of the wing and/or tail.

In an embodiment, the propellers may be synchronized electronically to hold a specific phase angle to provide destructive interference of each propeller's noise. This may result in a quieter aircraft as a whole relative to the sound generated by each propeller in isolation. In an embodiment, each successive propeller may rotate in an alternate direction to prevent the wake of one propeller blade impacting the wake of the adjoining propeller blade. In this manner, the wakes of the propellers may pass in the same direction as opposed to colliding head-on.

In an embodiment, the aircraft may include reflexed flaperons. The use of reflexed flaperons may delay the onset of stall on the wing during transition between the VTOL flight phase and the wing born flight phase. As discussed herein, "flaperons" refers to any control surface used as both ailerons and flaps. By having reflexed (i.e., trailing edge up) flap deflections, the reflexed flaperons reduce the circulation around the airfoil allowing the airfoil to go to a higher angle of attack before airflow separates.

In an embodiment, when the tail is tilted vertically in the VTOL flight phase, the vertical tail may serve a second role as a rear landing skid. In an embodiment, the wing tip motor pylons may serve as outboard landing skids, thereby giving the aircraft a wide stance on the ground to reduce tip over risk at landing.

In an embodiment, the outboard portion of the horizontal tail may be configured in a dihedral angle to provide directional stability during the slow speed portion of the transition corridor between the VTOL flight phase and the wing born flight phase.

In an embodiment, an aircraft may utilize a battery augmented series hybrid electric propulsion system. This use of a battery augmented series hybrid electric propulsion system may reduce propulsion system weight and enable unconventional configurations. In an embodiment, all propellers may be turned by electric motors. In an embodiment, electrical power to operate each motor may be provided from one or both of two sources. A first source may be a primary electrical source comprised of generators driven by internal combustion engines. A second electrical source may be battery packs. In an embodiment, the internal combustion engines may be sized to meet the power requirements during the wing born flight phase, but the power required in the VTOL flight phase and during transition may be greater than the power required in the wing born flight phase. The battery packs may be sized to make up for the difference between the power required in the VTOL flight phase and during transition and the power the internal combustion engines may provided by turning the alternators. This embodiment configuration may support the minimum propulsion system weight (as opposed to sizing the internal combustion engines for power required for VTOL flight) for missions where the time spent in hover may be a small percent of the time spent in wing born flight. The embodiment series hybrid propulsion system may effectively act as an "electric driveshaft" and an "electric gearbox" eliminating the driveshafts and gear boxes necessary to distribute power to each propeller in previous aircraft by filling the same function. In an embodiment, in hovering flight the internal combustion engines may turn generators, and the electrical power from the generators may be feed to a controller that outputs uniform direct current ("DC") power. The DC power may be distributed via wires throughout the aircraft. The DC power may be provided to a motor controller associated with each motor which may convert the DC power to alternating current ("AC") power to drive the AC motors turning the propellers. The advantage of converting the AC output of the generators to DC power and the converting the DC power to AC power at each motor may be that the motor controller for each motor may independently drive its associated motor allowing the RPM to be varied on a per motor basis. The use of two controllers may result in some power loss due to the inefficiency of the controllers. In an embodiment, in wing born flight the internal combustion engines may turn the generators and the AC power output by the generators may be provided via wires directly to the motors without using intermediate controllers, thereby operating the generators and motors in a synchronous mode. This may avoid controller loss. The RPM of the generator may need to be equal to the RPM of the motor being driven or if the pole count of the generator is different than the pole count of the motor, the ration of the motor to generator RPM may be the ratio of the motor to the generator pole count.

In an embodiment, the use of electric motors to drive the propellers may provide an aircraft with a propulsion system that has no single point of failure. The use of multiple electric motors may enable the failure of one motor to occur and the aircraft to still fly. Because electric motors may put out more power by turning at a higher RPM, in the event of a motor failure, other propellers, as required, may be turned at a higher RPM by their respective motors ensuring the aircraft may still be flyable. The increase of RPM may put out more thrust per remaining propeller (meaning also more noise), but the aircraft may remain flyable.

In an embodiment, the propellers of the aircraft may turn at a low tip speed, enabling the aircraft to achieve a very low noise profile.

Unique wind tunnel testing that combines a nested face-centered design of experiments ("DOE") with optimal design points to achieve testing efficiency and statistically sound mathematical models were developed. This methodology required new tools and specialized tunnel software to execute the experiment, such as allowing randomized set points, as well as substantial automation of both the wind tunnel model and test facility. The new methodology reduced testing time by over sixty years.

The applications for the various embodiment aircraft that may take off and land vertically and yet fly for a long duration and range are numerous. Applications may range from military reconnaissance missions, to police and fire department surveillance roles, to civilian automated door to door package delivery (e.g., mail, prescription drugs, food, etc.), to air taxi services.

Figure 1:
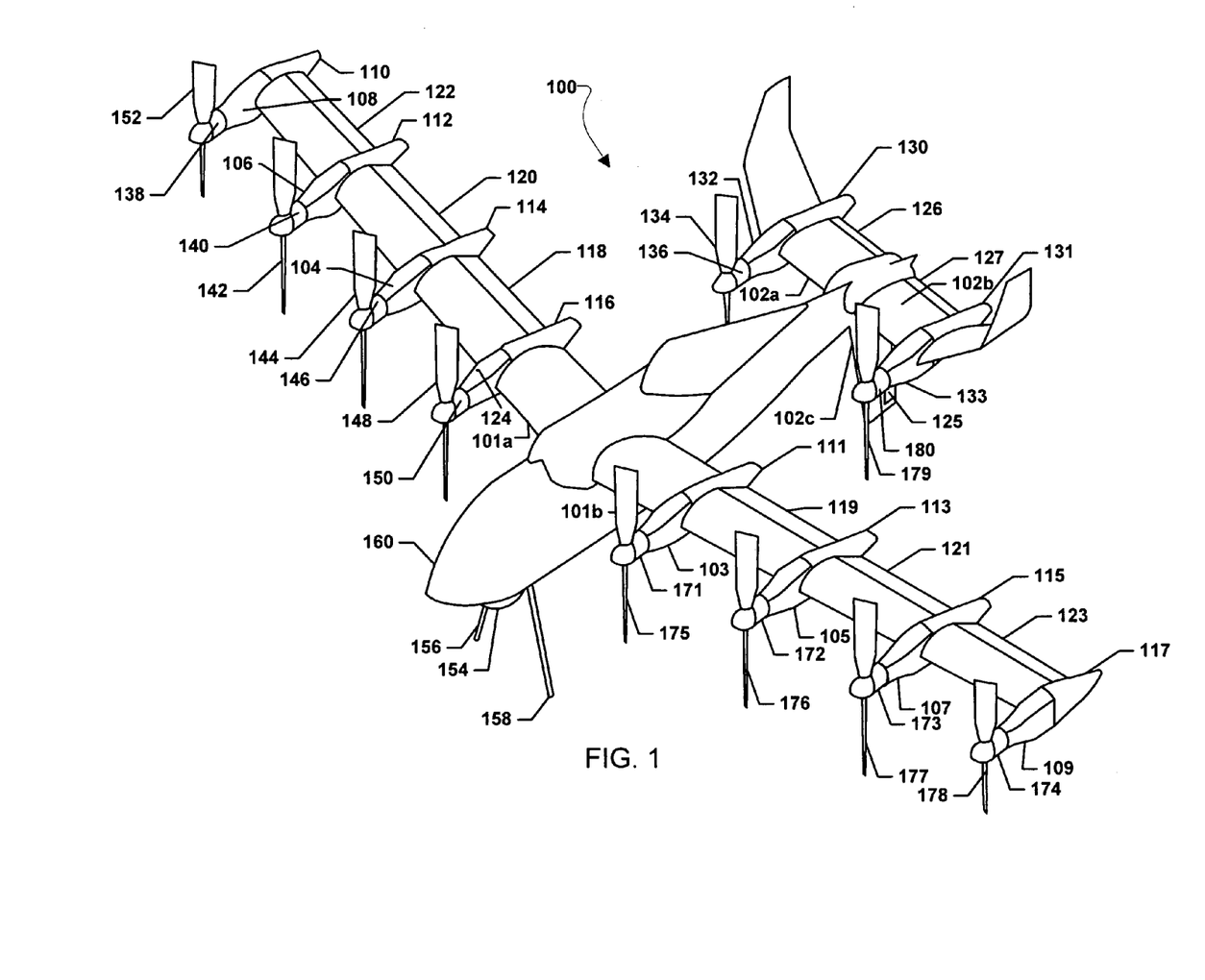
FIG. 1 is a front/left upper perspective view of an embodiment VTOL and cruise efficient aircraft.

FIGS. 1-6 illustrate various views of an embodiment VTOL and cruise efficient vehicle, such as aircraft 100. FIG. 1 illustrates the front/left upper perspective view of the embodiment aircraft 100 with the wing (comprised of wing sections 101a and 101b) and horizontal tail sections 102a and 102b (comprising the tilting portions of the overall tail comprised of tiltable horizontal tail sections 102a and 102b and vertical tail section 102c which remains fixed) in the wing born flight phase configuration (i.e., tilted down parallel to the longitudinal axis of the fuselage 160). In an embodiment, the aircraft 100 may include four engine nacelles on each wing section 102a and 102b and one engine nacelle on each tail horizontal tail section 102a and 102b. The engine nacelles may be comprised of pairings of pylons 103, 104, 105, 106, 107, 108, 109, 124, 132, and 133 and respective fairings 110, 111, 112, 113, 114, 115, 116, 117, 130, and 131. In an embodiment, each of the pylons 103, 104, 105, 106, 107, 108, 109, 124, 132, and 133 may have the same outside mold line ("OML") while each of the fairings 110, 111, 112, 113, 114, 115, 116, 117, 130, and 131 may have its own OML. Electric motors may be coupled to each pylon 103, 104, 105, 106, 107, 108, 109, 124, 132, and 133 to drive a propeller associated with each nacelle. Pylons 108, 106, 104, 124, 132, 103, 105, 107, 109, and 133 are illustrated with their respective electric motors 138, 140, 146, 150, 136, 171, 172, 173, 174, and 180 as well as their respective propellers 152, 142, 144, 148, 134, 175, 176, 177, 178, and 179. In an embodiment, propellers 152, 134, 178, and 179 may be variable pitch propellers and propellers 142, 144, 148, 175, 176, and 177 may be fixed pitch propellers. In an embodiment, propellers 142, 144, 148, 175, 176, and 177 may fold down when not in use, such as during wing born flight. Propellers 152, 134, 142, 144, 148, 178, 179, 175, 176, and 177 may have any number of blades, such as two blades, three blades, etc. In an embodiment, the aircraft 100 may include flaperons 118, 119, 120, 121, 122, and 123 on the wing and flaperons 126 and 127 on the tail. The flaperons 118, 119, 120, 121, 122, and 123 may be disposed on the trailing edge of the wing between successive nacelles. The flaperons 126 and 127 may be disposed on the trailing edge of the tail inboard of the tail mounted nacelles. The aircraft 100 may also include a vertical control surface on the vertical tail section 102c, such as a rudder 125. The aircraft 100 may include a camera 154 extending from the fuselage 160. In an embodiment, the aircraft 100 may include landing gear, such as retractable nose skids 156 and 158.

Figure 2:
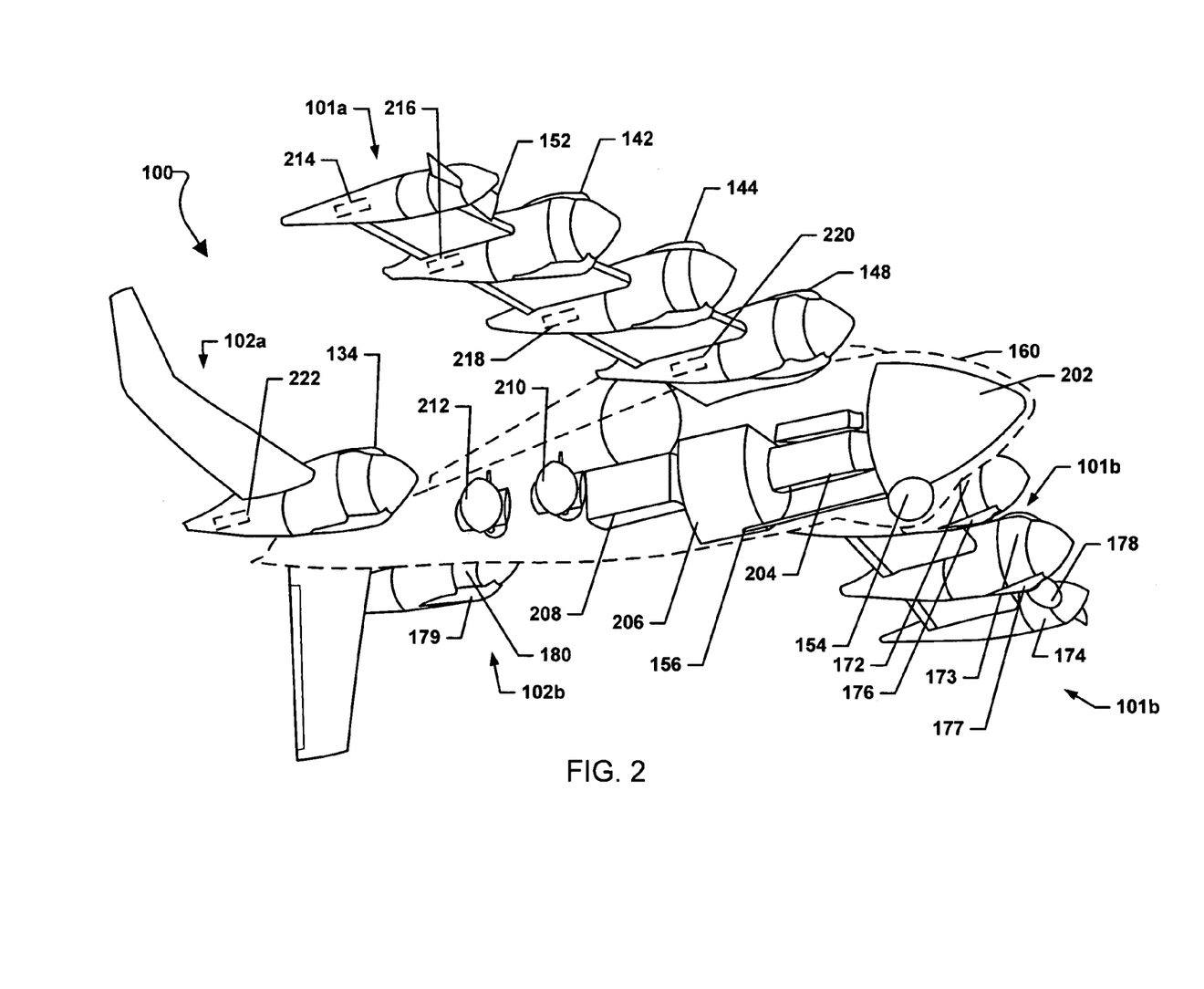
FIG. 2 is a front/right lower perspective view of the embodiment VTOL and cruise efficient aircraft.

FIG. 2 illustrates a front/right lower perspective view of the embodiment VTOL and cruise efficient aircraft 100 shown with a cutaway view of the fuselage 160. In FIG. 2 the aircraft 100 may be configured for the wing born flight phase with propellers 142, 144, 148, 176, 177, 134, and 179 folded back against their respective pylons. In an embodiment, two primary power sources 210 and 212 may be comprised of internal combustion engines, such as two eight horse power diesel engines, coupled to two generators. The fuselage 160 may include a fuel tank 106 storing fuel for the primary power sources 210 and 212. The primary power sources 210 and 212 may be connected via wires and various controllers (not shown) to each of the electric motors and may provide power to drive the propellers. In an embodiment, batteries may be housed in each nacelle, such as batteries 214, 216, 218, 220, and 222 and their mirrored counterparts on the opposite side wing section 101b and horizontal tail section 102b. These batteries may also be connected to the electric motors via wires and various controllers (not shown) and may provide power to drive the propellers. Together the primary power sources 210 and 212 and various batteries may comprise a battery augmented series hybrid electric propulsion system for the aircraft 100. The aircraft 100 may include a satellite communication system comprised of various modules 204 and 208, and the aircraft may carrier a payload 202. As illustrated in FIG. 2, the skids 156 and 158 may retract up to the fuselage 160 during wing born flight.

Figure 3:
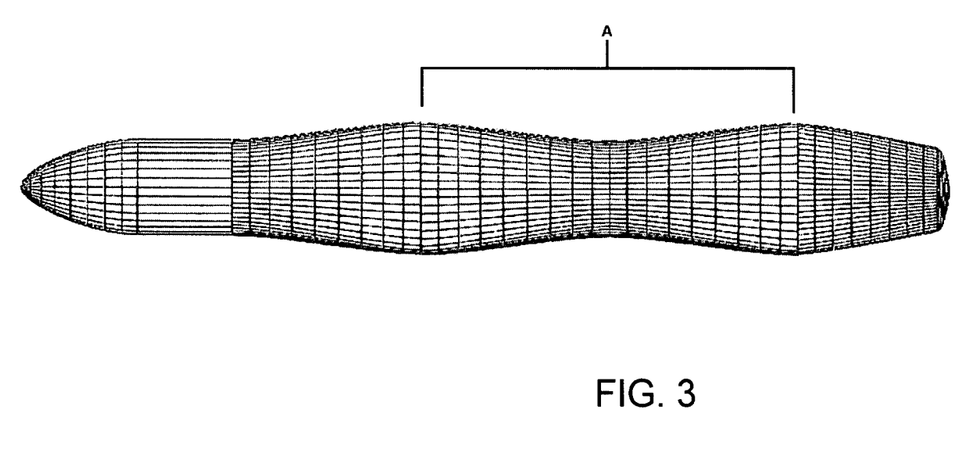
FIG. 3 is a top view of an embodiment of a pylon for the present invention.

In an embodiment, the airfoil may be a custom designed shape to be a tradeoff between low drag at high lift coefficients, ease of wing fabrication, and gradual stall characteristics. In an embodiment, motor pylons may be shaped to minimize drag at high lift coefficients. Normally, when mounting pylons or nacelles at the leading edges of the wings, the pylons or nacelles mature the boundary layer and cause the airflow over the wing to separate early leading to a loss of lift and an increase in drag. In an embodiment, the area of the cross section of the pylons may vary from forward to aft. As an example shown in FIG. 3, the pylons of the various embodiments may have a bottle-type configuration (or shape) where the cross sectional area may be comparatively less in a middle portion A of the pylon than in a forward or aft sections of the pylon which may minimize the super velocity around the pylon. As shown in FIG. 3, in one embodiment, the middle portion A is substantially hour-glass shaped, thus reducing the drag between the wing and the pylon. The bottle configuration (or shape) of the pylons may reduce the drag due to interaction with the wing. The airflow must accelerate to move around the thick regions, and it may be desirable to not have the thick region of the wing in the same place as the thick region of the pylons. The bottle configuration (or shape) may enable the thick regions of the pylon to be moved away from the thick region of the wing. When the wing has its proverse pressure gradient, the pylons may be shaped to have an adverse pressure gradient and when the wing has its adverse pressure gradient, the pylons may be shaped to have a proverse pressure gradient.

Figure 4:
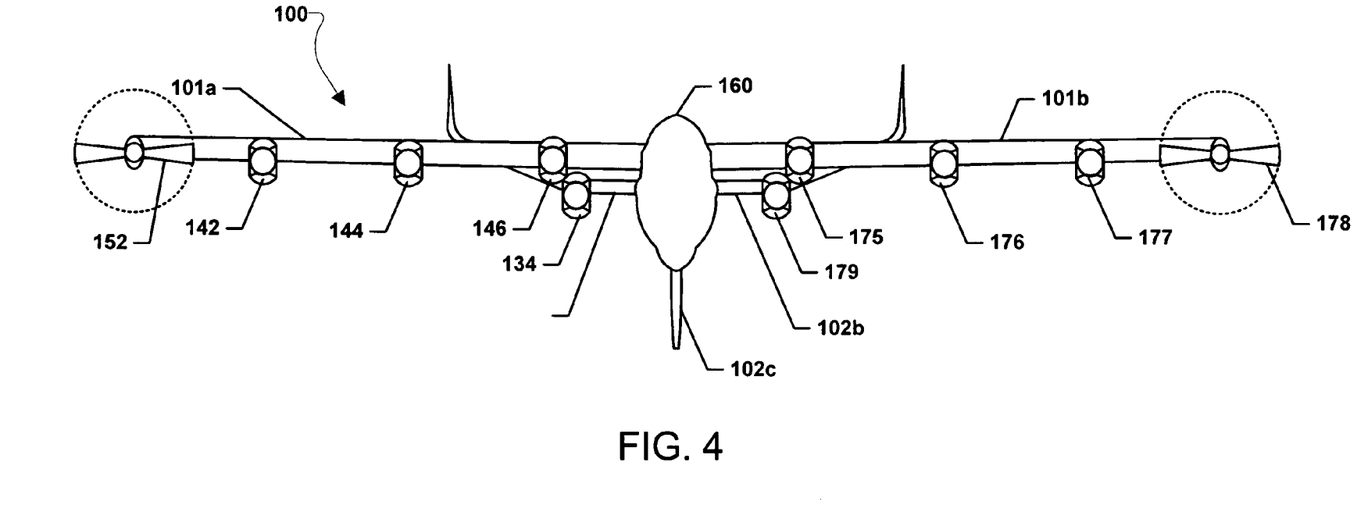
FIG. 4 is a front view of the embodiment VTOL and cruise efficient aircraft.

FIG. 4 illustrates a front view of the embodiment VTOL and cruise efficient aircraft 100 in the wing born flight phase. In an embodiment, during wing born flight, the propellers 142, 144, 146, 134, 236, 302, 234, and 230 may fold down and only the propellers 152 and 224 may operate.

Figure 5:
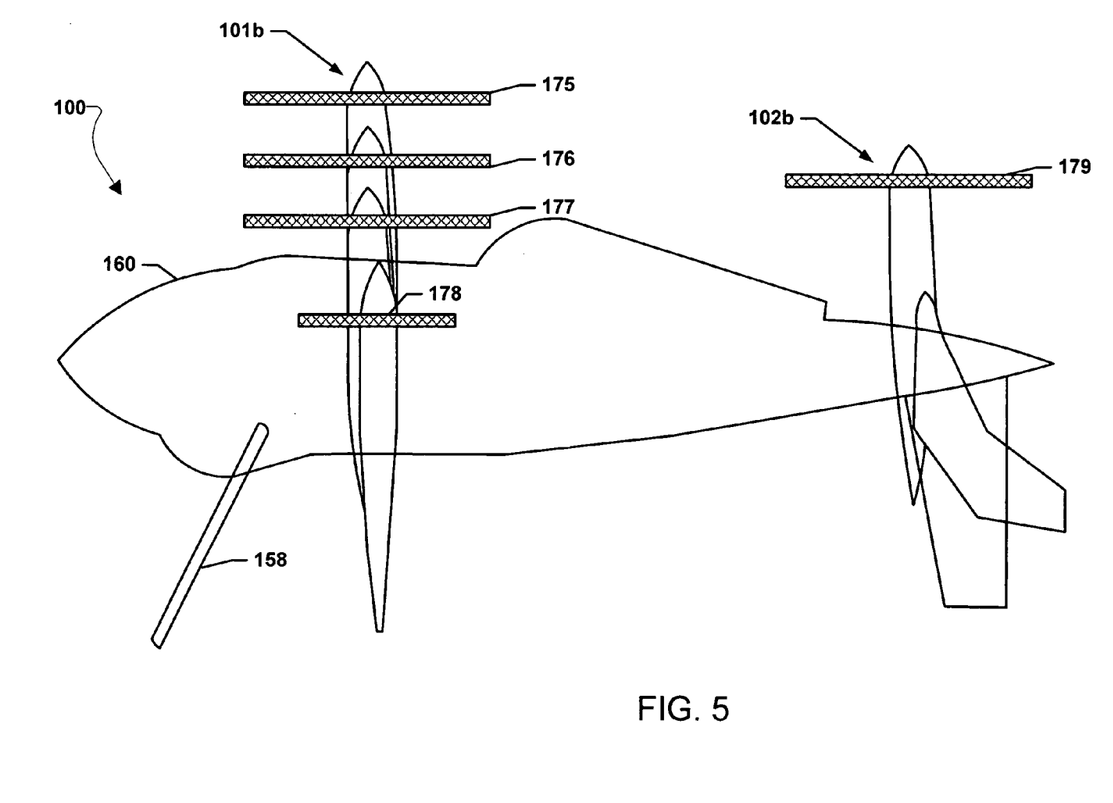
FIG. 5 is a left side view of the embodiment VTOL and cruise efficient aircraft in a VTOL flight phase.

FIG. 5 illustrates a left side view of the embodiment VTOL and cruise efficient aircraft 100 in a VTOL flight phase. In the VTOL flight phase the wing and horizontal tail sections may be tilted up, such as to 90 degrees. In an embodiment, the propellers 175, 176, 177, 178, and 179 (and their right side counterparts), may all be driven by their respective motors in the VTOL flight phase. In another embodiment, the propellers 175, 176, 177, and 179 (and their right side counterparts) may be driven by their respective motors in the VTOL flight phase, while propeller 178 (and its right side counterpart) may not be driven by their respective motors. In an embodiment, the skids 156 and 158 and vertical tail surface 102c may be configured to support the aircraft 100 on the ground and the outboard wing nacelles may be configured to act as outboard landing skids. During VTOL flight, pitch may be controlled by the fore and/or aft propeller thrust modulation, roll may be controlled by left and/or right propeller thrust modulation, and yaw may be controlled by counter clock wise and clock wise rotation of the various propellers and the flaperons. In an embodiment, yaw may also be controlled by differential deflection of the flaperons.

Figure 6:
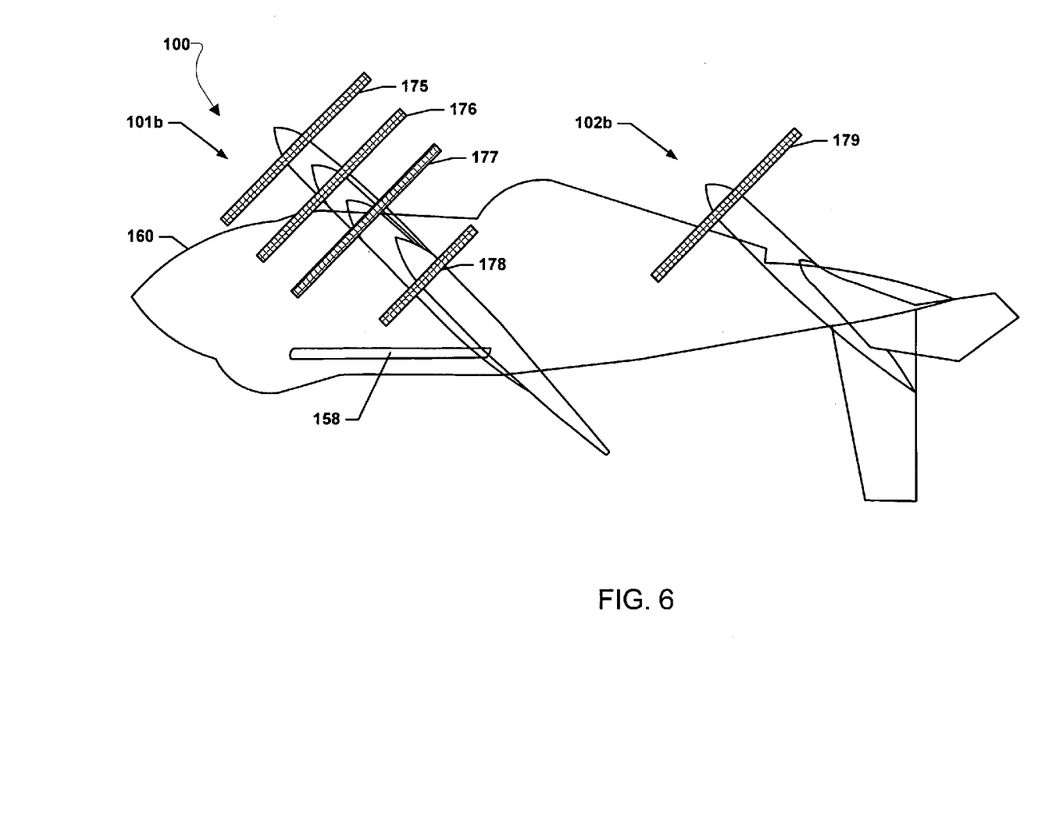
FIG. 6 is a left side view of the embodiment VTOL and cruise efficient aircraft transitioning between the VTOL flight phase and a wing born flight phase.

FIG. 6 illustrates a left side view of the embodiment VTOL and cruise efficient aircraft 100 transitioning between the VTOL flight phase and a wing born flight phase. During the transition between VTOL flight and wing born flight the wing and horizontal tail surfaces may tilt (for example tilt down to transition from VTOL flight to wing born flight and tilt up to transition from wing born flight to VTOL flight). In an embodiment, the propellers 175, 176, 177, 178, and 179 (and their right side counterparts), may all be driven by their respective motors in the transition phase. In another embodiment, less than all the propellers may be driven during the transition. Additionally, the landing skids 156 and 158 may retract.

Figure 7:
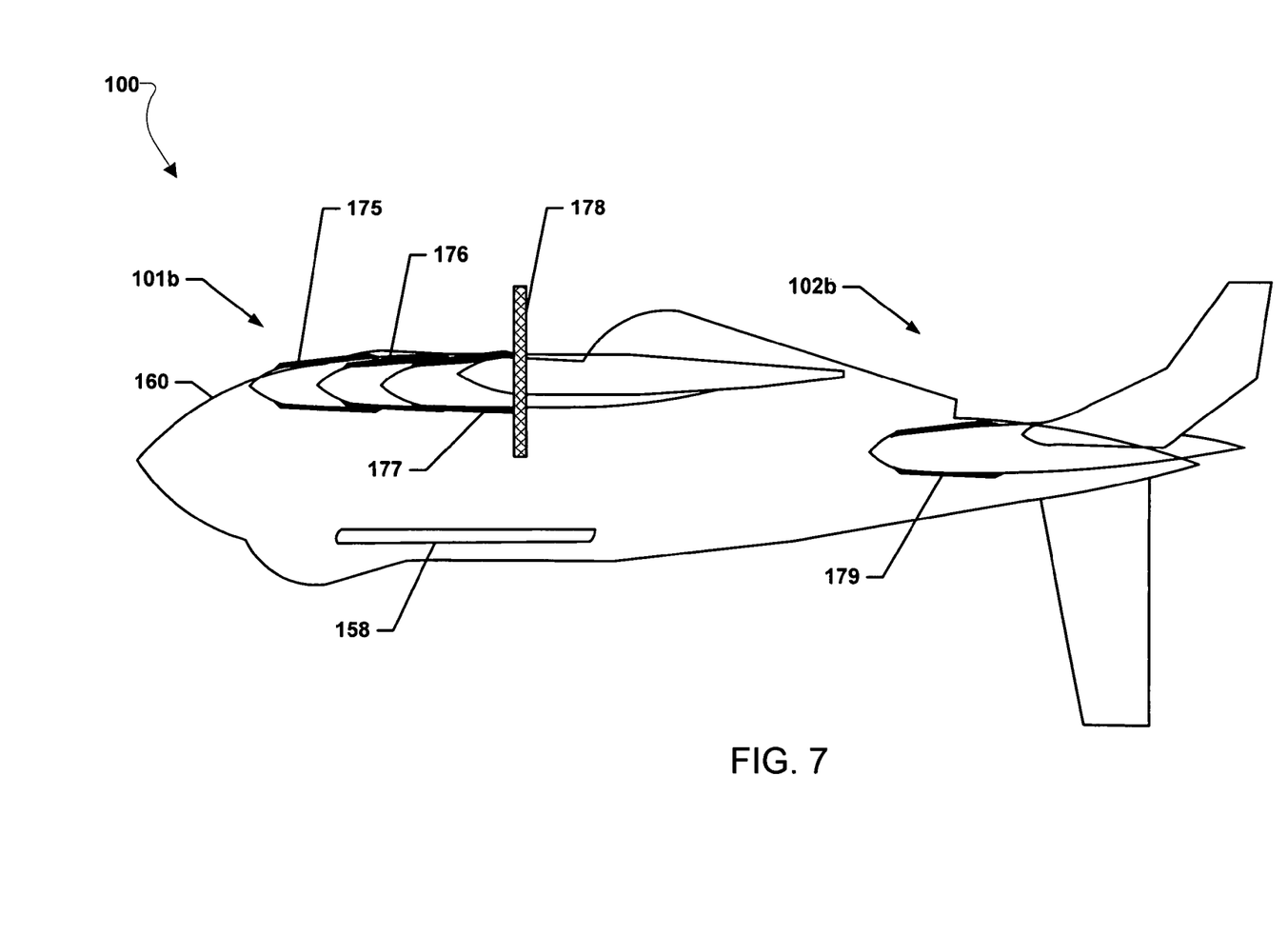
FIG. 7 is a left side view of the embodiment VTOL and cruise efficient aircraft in the wing born flight phase.

FIG. 7 illustrates a left side view of the embodiment VTOL and cruise efficient aircraft 100 in the wing born flight phase. The wing and horizontal tail sections may be tilted down and the propellers 175, 176, 177, and 179 (and their right side counterparts) may be stopped and folded back wing born flight phase, while propeller 224 (and its right side counterpart) may be driven by their respective motors to provide the necessary propulsion for wing born flight. During wing born flight, pitch may be controlled by elevators for quick changes and/or by tail rotation for slow rotation, roll may be controlled by the flaperons, and yaw may be controlled by the rudder.

In one embodiment, the aircraft 100 may be an unmanned aerial vehicle sized for ease of vehicular roadway transportation. For example, the aircraft 100 may have a tow weight of less than or equal to about two hundred and fifty pounds and may break down into no more than three storage boxes. In one embodiment, aircraft 100 may have a set up and launch time of less than sixty minutes by two trained operators, including off load, assembly, fueling, system checks, and start up. The operators may locally direct takeoff of the aircraft 100 than transfer control to a remote location via satellite data link. During recovery the operators may receive control locally to direct the landing, and landing and vehicle breakdown may take less than thirty minutes for two trained operators, including shut down, drainage of fuel, disassemble, and loading of the aircraft 100.

In an embodiment, a payload of the aircraft 100 may be a science payload of twenty five pounds, requiring five hundred watts of power, and having a volume of about 2500 cubic inches. The aircraft 100 may also carry a communications payload of about thirty five pounds and requiring two hundred and seventy watts of power. In an embodiment, the aircraft 100 may have a small launch/recovery footprint defined by a twenty foot by twenty foot box. The aircraft 100 may provide landing accuracy and sensor placement within about 1.5 meters of an intended location. The aircraft 100 may provide for loiter missions and/or sensor placement missions. In an embodiment, the aircraft 100 may be able to fly only on the secondary power source of the electricity from the batteries during wing born flight for short periods of time in order to fly quietly. In an embodiment, the aircraft may be able to climb to 100 feet before transitioning to wing born flight.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The invention claimed is:

1. A vehicle, comprising:
a wing configured to tilt through a range of motion;
a first series of electric motors coupled to the wing and each configured to drive an associated wing propeller;
a tail configured to tilt through the range of motion;
a second series of electric motors coupled to the tail and each configured to drive an associated tail propeller; and
an electric propulsion system connected to the first series of electric motors and the second series of electric motors,
wherein the first series of electric motors comprises eight electric motors and the second series of electric motors comprises two electric motors,
wherein the associated wing propellers of two of the electric motors of the first series of electric motors are variable pitch propellers each located at a wing tip of the wing, and
wherein the associated wing propellers of the remaining six of the electric motors of the first series of electric motors are fixed pitch propellers.

2. The vehicle of claim 1, wherein the associated tail propellers of the second series of electric motors are variable pitch propellers.

3. The vehicle of claim 2, wherein the associated wing propellers of the remaining six of the electric motors of the first series of electric motors and the associated tail propellers of the second series of electric motors are configured to fold back during a wing born flight phase.

4. The vehicle of claim 1, wherein the wing and the tail are arranged in a semi-tandem configuration.

5. The vehicle of claim 1, further comprising reflexed flaperons on the wing and tail.

6. The vehicle of claim 1, wherein the motors are mounted on motor pylons which are shaped to reduce drag at high lift coefficients.

7. The vehicle of claim 6, wherein each motor pylon has a cross sectional area that is comparatively less in a middle portion than in a forward section or an aft section.

8. The vehicle of claim 1, wherein the vehicle is an unmanned aerial vehicle.

9. The vehicle of claim 1, further comprising retractable landing skids and wherein the tail is configured to act as a rear landing skid.

10. A vehicle, comprising:
a wing configured to tilt through a range of motion;
a first series of electric motors coupled to the wing and each configured to drive an associated wing propeller;
a tail configured to tilt through the range of motion;
a second series of electric motors coupled to the tail and each configured to drive an associated tail propeller; and
an electric propulsion system connected to the first series of electric motors and the second series of electric motors,
wherein the first series of electric motors comprises at least three electric motors,
wherein the associated wing propellers of at least two of the electric motors of the first series of electric motors are variable pitch propellers each located at a wing tip of the wing, and wherein the associated wing propeller of at least one of the electric motors of the first series of electric motors is a fixed pitch propeller.

11. The vehicle of claim 10, wherein the associated tail propellers of the second series of electric motors are variable pitch propellers.

12. The vehicle of claim 10, wherein the wing and the tail are arranged in a semi-tandem configuration.

13. The vehicle of claim 10, further comprising reflexed flaperons on the wing and tail.

14. The vehicle of claim 10, wherein the motors are mounted on motor pylons which are shaped to reduce drag at high lift coefficients.

15. The vehicle of claim 14, wherein each motor pylon has a cross sectional area that is comparatively less in a middle portion than in a forward section or an aft section.

16. The vehicle of claim 10, wherein the vehicle is an unmanned aerial vehicle.

* * * * *